Sept. 12, 1944.   C. C. FEAGLEY ET AL   2,357,943
CHEMICAL APPARATUS
Filed June 10, 1941
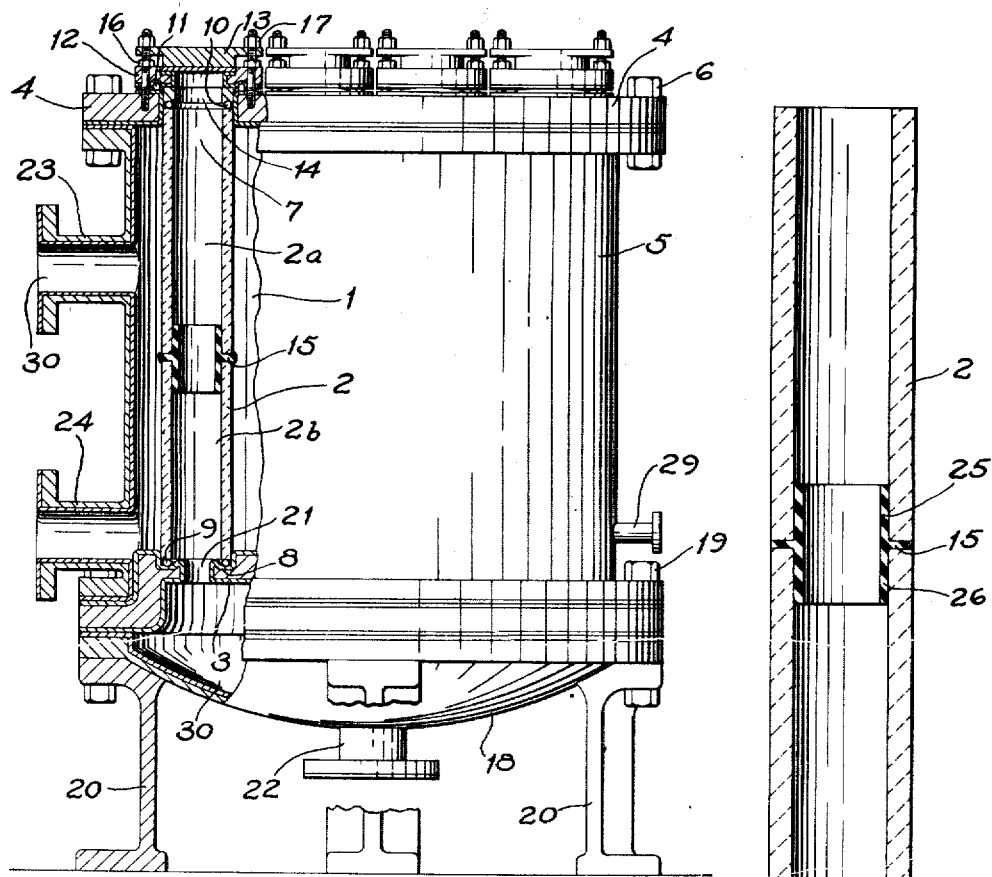
Fig. 1
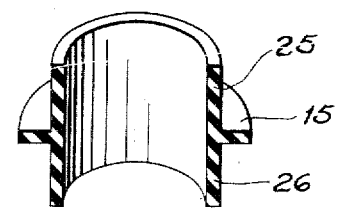
Fig. 3
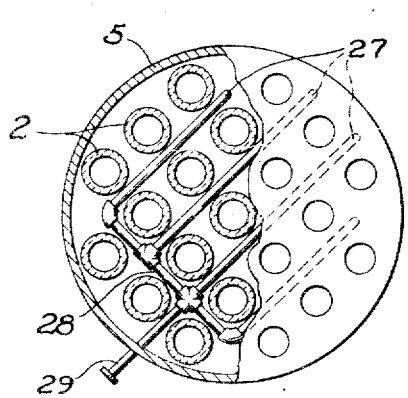
Fig. 2
Fig. 4
Chester C. Feagley
Glenn D. Robinson   INVENTORS
BY George T. Hansen
ATTORNEY Patented Sept. 12, 1944

2,357,943

UNITED STATES PATENT OFFICE 2,357,943

CHEMICAL APPARATUS

Chester C. Feagley, Drexel Hill, and Glenn D. Robinson, Yeadon, Pa., assignors to E. I. du Pont de Nemours & Company, Wilmington, Del., a corporation of Delaware Application June 10, 1941, Serial No. 397,374

5 Claims. (Cl. 210—120)

This invention relates to chemical apparatus and is particularly directed to new and useful improvements in porous tube filters useful in filtration of corrosive chemical solutions.

Porous tube filters are commonly used in chemical processes where, due to corrosion, temperature or other physical and chemical conditions, the usual types of filters are unsuitable. These filters are usually operated under pressure or vacuum and in their usual commercial form consist of a plurality of hollow, cylindrical, porous tubes arranged in a suitable pressure vessel so that the interior of the tubes communicate with a low-pressure chamber into which the filtrate is collected.

The usefulness of the porous tube filters heretofore available has been limited in that they are generally undesirable for filtering liquids containing any appreciable volume of solids or under circumstances in which solids pack down between the tubes. Thus it has been observed that in certain operations as in the clarification of hot alum liquors accumulation of solids between the filter tubes limits the usefulness of such filters due to excessive tube breakage and to difficulties in backwashing. Thus we have observed that when such filters are utilized with more concentrated suspensions there is a tendency for the solids to settle out unevenly over the filter surface and to cause an unequal distribution of pressure on the several porous tubes. While this may be avoided by increasing the spacing between the tubes, such modifications introduce other undesirable features such as higher cost, less flexibility in washing and solids removal, and other difficulties in fluid flow and equipment operation.

It is an object of this invention to provide an improved porous tube filter. It is another object of the invention to avoid the difficulties of the prior art. It is still another object of the invention to prevent filter tube breakage. It is still another object of the invention to avoid unbalanced pressures between the filter tubes. It is another object of the invention to enlarge the usefulness of a porous tube filter. It is still another object of the invention to provide a porous tube filter suitable to operations involving removal of appreciable quantities of solids as compared with the usual operations involving only final clarification, polishing, or the removal of relatively small quantities of solids. It is still another object of the invention to provide improved backwashing. It is still another object of the invention to provide for more complete removal of accumulated solids from the filter. It is still another object of the invention to reduce the quantity of backwash water required for sluicing the accumulated solids. Still further objects of the invention will appear hereinafter.

These objects are accomplished by the following invention in which Figure 1 is an elevation in partial section; Figure 2 is a sectional plan view; Figure 3 is a longitudinal section of a porous tube assembly; and Figure 4 is a perspective of the gasket as shown in Figure 3.

The apparatus illustrated in these figures is illustrative of a typical modification of the invention. This filter is made up of a cylindrical pressure vessel 1 constructed and arranged to be divided into an inlet, or high-pressure chamber, and an outlet or low-pressure chamber, by a plurality of porous tubes 2. These tubes are disposed in the vessel as indicated in Figure 2, and are supported between the lower tube sheet 3 and the upper tube sheet 4. The upper tube sheet 4 forms the top of the vessel 1 and is secured to the cylinder 5 by suitable fastening means 6. It is provided with a plurality of apertures of the size and shape of the tubes 2 so that the tubes may be inserted into or withdrawn from the vessel 1. This construction is best seen at 7, Figure 1. The tubes 2 are supported in annular grooves 8 in the bottom tube sheet 3 and rest on resilient gaskets 9 located in these grooves. The lower tube sheet 3 forms the bottom of the high-pressure chamber which is otherwise defined by the cylinder 5, the walls of the porous tubes 2 and the upper tube sheet 4. The tubes 2 are of such length that they terminate midway of the upper tube sheet 4 and are sealed therein by means of the resilient gaskets 10 and 11 and the closure means 12 and 13. The annular member 14 is so arranged as to communicate pressure from the cover 12 to the gaskets 9, 10, and 15. Thus the tubes are secured in place by clamping down the cover 12 by the fastening means 16. The cover 12 is provided with an aperture communicating with the interior of tubes 2. This aperture is closed by the removable closure 12 adapted to be clamped in place by the fasteners 17.

The low pressure or outlet chamber is formed by the bottom 18 and the lower tube sheet 3. The two are fastened together and fastened to the bottom of the cylinder 5 by suitable fasteners 19 and the whole is mounted on suitable support 20. The bottom tube sheet 3 is provided with apertures 21 to form a communication between the low-pressure chamber and interior of the tubes 2. Thus liquid filtering thru the porous tubes 2 runs down thru apertures 21 into the outlet chamber whence they may be drawn off thru outlet 22. This outlet is complementary to the inlet 23 and communication is had thru the pores of the porous tubes 2. Also complementary to the outlet 22 is the backwash drain 24.

It has been the practice heretofore to use single tubes which were intact from the gasket 9 to the gasket 10. We have found, however, that such tubes are liable to breakage due to unbalancing of pressure when the filter is operated with relatively concentrated suspension. We have now found that this pressure unbalance can be equalized and tube breakage avoided by forming the tube of two sections 2—a and 2—b and inserting the resilient gasket 15. Thus when the tube elements a and b are in position as shown in Figure 1, the gaskets 9, 10, and 15 are under compression and the tube elements are held normally alined in vertical position but are free to flex in any direction within the limits of the flexibility of the gaskets 9, 10, and 15. Hence the tube is free to flex one way or another as may be required to equalize unbalanced pressures which may rise due to uneven accumulation of solids in the space between the tubes.

The gasket 15 may be of any suitable design and should be associated with means for keeping the tube elements a and b in alinement with their ends properly seated on the gasket. In the form of the invention shown this is accomplished by the tubular flanges 25 and 26 formed integral with the inner periphery with the gasket 15 and so arranged as to fit snugly in the ends of the tube elements a and b.

Thus the tube elements 2—a and 2—b are alined on a common axis with their adjacent ends united by a resilient seal and with their opposite ends cushioned on resilient seals. As long as the tube assembly includes at least three such seals it will be free to flex under the influence of unbalanced pressure.

Further to increase ability of the filter to handle relatively concentrated suspensions and thereby to make it practical to utilize the increased capacity made possible by means of the construction described, we have provided means for facilitating the repulping of the filter cake so that backwashing may be made easier, complete removal of a filter cake can be obtained and the quantity of backwash held low enough to prevent excessive losses. Also, by making it possible easily to remove the filter cake completely, the tendency for it to build up unevenly between the filter tubes is reduced and with it the consequent tendency for pressure unbalance in the filter. We have found that these ends may be accomplished simply and effectively by locating in the filter adjacent to the bottom tube sheet 3 suitable means for directing jets of fluid under pressure into the spaces between the filter tubes during the backwash.

Suitable apparatus for this purpose is illustrated in Figures 1 and 2 where adjacent the bottom tube sheet 3 there are located a number of perforated pipes 27 which communicate with a manifold 28 which in turn communicates with the inlet pipe 29 thru which a fluid, liquid or gas may be introduced under sufficient pressure completely to reslurry the filter cake during the backwash. The perforations may be so located as to direct the jets downwardly toward the bottom tube sheet 3 and laterally in between the various tubes so that when the filter is charged with a limited quantity of backwash the filter cake can be completely repulped and drawn off thru the backwash drain 24. This repulping of the filter cake may be effected in this manner completely with liquor introduced as backwash from the low-pressure chamber or introduced thru the inlet 23 or backwash drain 24. In any case, the amount of backwash thus required completely to remove the filter cake is lowered. The repulping is done simultaneously with the jetting of air or other fluid into the vessel as described.

The solids filtered build up as a cake more or less uniformly over the surface of the filter tubes 2 with some tendency for the more heavy accumulations to form near the bottom of the tubes. When this cake is stripped off by the backwash thru the tubes it tends to accumulate in rather large pieces on the tube sheet 3 where it is broken up and repulped by the turbulence created by jetting a fluid onto the bottom tube sheet 3 as described. Hence in the apparatus of our invention it is no longer necessary to employ sufficient quantity of backwash to sluice out the sediment which accumulates in the bottom in relatively large amounts but rather by violently dispersing and disrupting such accumulations all the collected solids may be sluiced out with relatively small quantities of backwash.

The apparatus is customarily suitable for filtering hot or corrosive liquid and may be provided with a suitable corrosion-resistant lining as illustrated at 30, and the various gaskets 9, 10, and 15 may be constructed of suitably corrosion- and heat-resisting, flexible, compressible material such as rubber and various synthetic products having rubber-like properties.

The tube elements 2—a and 2—b may be of unequal length. Suitably the ratio of the tube elements may vary from 1:1 to 2:1, but it is understood that the invention in its broader aspects is not so limited as the invention is operative without these limits. The invention admits of spacing the tubes relatively close together and economy of maintenance and design may be obtained if the tube centers are not spaced more than about two diameters apart and more desirably if the tubes do not occupy more than about one-half the area of the lower tube sheet.

We claim:

1. A porous tube filter comprising an upright cylindrical vessel, a horizontally disposed tube sheet adapted to divide said vessel into upper and lower chambers, a plurality of apertures in said tube sheet, means centering and sealing a porous tube over each of said apertures and means for sealing the upper ends of said porous tubes whereby the upper chamber is separated from the lower chamber by the walls of said porous tubes and the liquid is free to flow from one chamber into the other only through the walls of said porous tubes, a plurality of perforated tubes each having one end closed and the other communicating with a header disposed on said tube sheet and in between and normal to said porous tubes, and means for injusting a fluid under pressure into said header during the backwash of said filter.

2. In a porous tube filter having a multiplicity of parallel porous tubes having their ends resiliently anchored against radial movement and being so closely spaced that accumulation of filter cake on the outside of the tubes tends to cause an unequal distribution of pressure on said tubes, the combination therewith of means intermediate the length of said tubes permitting radial displacement of said porous tubes to equalize said pressure, said means consisting in a resilient, compressible annular gasket having integral tubular flanges extending into said tubes.

3. In a porous tube filter having a high pressure chamber and a low pressure chamber separated by the walls of a plurality of porous tubes arranged parallel one to the other and so closely together that accumulation of filter cake on the outside of the tubes tends to cause an unequal distribution of pressure on said tubes, the combination of plurality of parallel tubes assemblies each of which comprises a plurality of tube elements aligned on a common axis having their abutting edges united by a resilient seal and each of which has its free ends sealed in the filter structure by a resilient seal.

4. A porous tube filter comprising a plurality of parallelly disposed tube assemblies clamped together between two tube sheets and so closely spaced that accumulation of filter cake on the outside of the tubes tends to cause an unequal distribution of pressure on said tubes, said tube assemblies each comprising at least two separate tube sections aligned on a common axis and separated one from another and from said tube sheets by annular resilient compressible gaskets under compression of the tube assembly.

5. In a porous tube filter having a multiplicity of parallel porous tubes having their ends anchored in the filter structure against radial movement and being so closely spaced that accumulation of filter cake on the outside of the tubes tends to cause an unequal distribution of pressure on said tubes, the combination therewith of means intermediate the length of said tubes and between the ends of said tubes and the filter structure permitting radial displacement of said porous tubes intermediate of their length whereby to equalize said pressure, said means constituting resilient compressible annular gaskets.

CHESTER C. FEAGLEY.
GLENN D. ROBINSON.

CERTIFICATE OF CORRECTION.

Patent No. 2,357,943.  September 12, 1944.

CHESTER C. FEAGLEY, ET AL.

It is hereby certified that error appears in the printed specification of the above numbered patent requiring correction as follows: Page 2, second column, line 64, claim 1, for "injusting" read --injecting--; and that the said Letters Patent should be read with this correction therein that the same may conform to the record of the case in the Patent Office.

Signed and sealed this 27th day of March, A. D. 1945.

(Seal)

Leslie Frazer
Acting Commissioner of Patents.

pressure, said means consisting in a resilient, compressible annular gasket having integral tubular flanges extending into said tubes.

3. In a porous tube filter having a high pressure chamber and a low pressure chamber separated by the walls of a plurality of porous tubes arranged parallel one to the other and so closely together that accumulation of filter cake on the outside of the tubes tends to cause an unequal distribution of pressure on said tubes, the combination of plurality of parallel tubes assemblies each of which comprises a plurality of tube elements aligned on a common axis having their abutting edges united by a resilient seal and each of which has its free ends sealed in the filter structure by a resilient seal.

4. A porous tube filter comprising a plurality of parallelly disposed tube assemblies clamped together between two tube sheets and so closely spaced that accumulation of filter cake on the outside of the tubes tends to cause an unequal distribution of pressure on said tubes, said tube assemblies each comprising at least two separate tube sections aligned on a common axis and separated one from another and from said tube sheets by annular resilient compressible gaskets under compression of the tube assembly.

5. In a porous tube filter having a multiplicity of parallel porous tubes having their ends anchored in the filter structure against radial movement and being so closely spaced that accumulation of filter cake on the outside of the tubes tends to cause an unequal distribution of pressure on said tubes, the combination therewith of means intermediate the length of said tubes and between the ends of said tubes and the filter structure permitting radial displacement of said porous tubes intermediate of their length whereby to equalize said pressure, said means constituting resilient compressible annular gaskets.

CHESTER C. FEAGLEY.
GLENN D. ROBINSON.

---

CERTIFICATE OF CORRECTION.

Patent No. 2,357,943.   September 12, 1944.

CHESTER C. FEAGLEY, ET AL.

It is hereby certified that error appears in the printed specification of the above numbered patent requiring correction as follows: Page 2, second column, line 64, claim 1, for "injusting" read --injecting--; and that the said Letters Patent should be read with this correction therein that the same may conform to the record of the case in the Patent Office.

Signed and sealed this 27th day of March, A. D. 1945.

(Seal)

Leslie Frazer
Acting Commissioner of Patents.